United States Patent
Dudding et al.

(10) Patent No.: US 6,945,548 B2
(45) Date of Patent: Sep. 20, 2005

(54) AIR SPRING AND AIR SPRING MOUNTING ASSEMBLY

(75) Inventors: Ashley Thomas Dudding, Plainfield, IL (US); John Wayne Stuart, Chicago, IL (US); Jason Steby Thomas, Chicago, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 10/406,810

(22) Filed: Apr. 3, 2003

(65) Prior Publication Data

US 2004/0056446 A1 Mar. 25, 2004

Related U.S. Application Data

(63) Continuation of application No. PCT/US02/05351, filed on Feb. 21, 2002, and a continuation-in-part of application No. 09/793,740, filed on Feb. 26, 2001, now Pat. No. 6,851,689.

(51) Int. Cl.⁷ .................................................. B60G 9/04
(52) U.S. Cl. ..................... 280/124.157; 267/35; 267/66; 267/122; 267/131
(58) Field of Search ........................ 280/124.11, 124.16, 280/124.138, 124.13, 124.131, 124.132, 124.137, 124.144, 124.145, 124.148, 124.149, 124.153, 124.157, 124.58, 124.59; 267/35, 66, 122, 131, 64.19, 64.27

(56) References Cited

U.S. PATENT DOCUMENTS

| | | | | |
|---|---|---|---|---|
| 4,518,171 A | * | 5/1985 | Hedenberg | 280/6.159 |
| 4,756,550 A | * | 7/1988 | Raidel | 280/86.75 |
| 4,798,369 A | * | 1/1989 | Geno et al. | 267/64.11 |
| 4,934,733 A | * | 6/1990 | Smith et al. | 280/124.132 |
| 5,203,585 A | * | 4/1993 | Pierce | 280/124.116 |
| 5,275,430 A | * | 1/1994 | Smith | 280/6.151 |
| 5,326,128 A | * | 7/1994 | Cromley, Jr. | 280/656 |
| 5,427,404 A | * | 6/1995 | Stephens | 280/124.162 |
| 5,458,359 A | * | 10/1995 | Brandt | 280/124.111 |
| 5,678,845 A | * | 10/1997 | Stuart | 280/124.116 |
| 5,934,652 A | * | 8/1999 | Hofacre et al. | 267/64.27 |
| 5,954,351 A | * | 9/1999 | Koschinat | 280/124.116 |
| 6,089,583 A | * | 7/2000 | Taipale | 280/124.13 |
| 6,158,750 A | * | 12/2000 | Gideon et al. | 280/86.5 |
| 6,250,613 B1 | * | 6/2001 | Koeske et al. | 267/66 |
| 6,257,597 B1 | * | 7/2001 | Galazin | 280/6.151 |
| 6,290,244 B1 | * | 9/2001 | Hosoya | 280/124.157 |
| 6,328,322 B1 | * | 12/2001 | Pierce | 280/124.131 |
| 6,340,165 B1 | * | 1/2002 | Kelderman | 280/124.153 |
| 6,386,524 B1 | * | 5/2002 | Levy et al. | 267/64.27 |
| 6,386,525 B1 | * | 5/2002 | Stuart | 267/64.27 |
| 6,390,485 B1 | * | 5/2002 | Cadden | 280/124.163 |
| 6,428,027 B1 | * | 8/2002 | Stuart | 280/124.157 |
| 6,752,407 B2 | * | 6/2004 | Warinner | 280/124.116 |

* cited by examiner

*Primary Examiner*—Paul N. Dickson
*Assistant Examiner*—Toan C To
(74) *Attorney, Agent, or Firm*—Cook, Alex, McFarron, Manzo, Cummings & Mehler, Ltd.

(57) ABSTRACT

A non-torque reactive air suspension exhibiting excellent roll stability characteristics is shown to include frame hangers mounted to frame rails extending longitudinally on opposite sides of a vehicle. Longitudinally extending beams are connected to the frame hangers at one end and extend parallel to the frame rails. At their other ends, the beams are joined by a crossbrace extending laterally across the vehicle centerline. In a central portion thereof, the beams have an axle pivot bore to which an axle clamp assembly is connected, the axle clamp assembly clamping a drive axle housing for the vehicle. The axle pivot bore is generally aligned with the drive axle. A control rod assembly is connected to suspension or frame components. Together with the beams, the control rod assembly forms a parallelogram configuration wherein the beams form the lower linkages of that configuration and the control rods included within the control rod assembly form the upper linkages of that configuration.

20 Claims, 11 Drawing Sheets

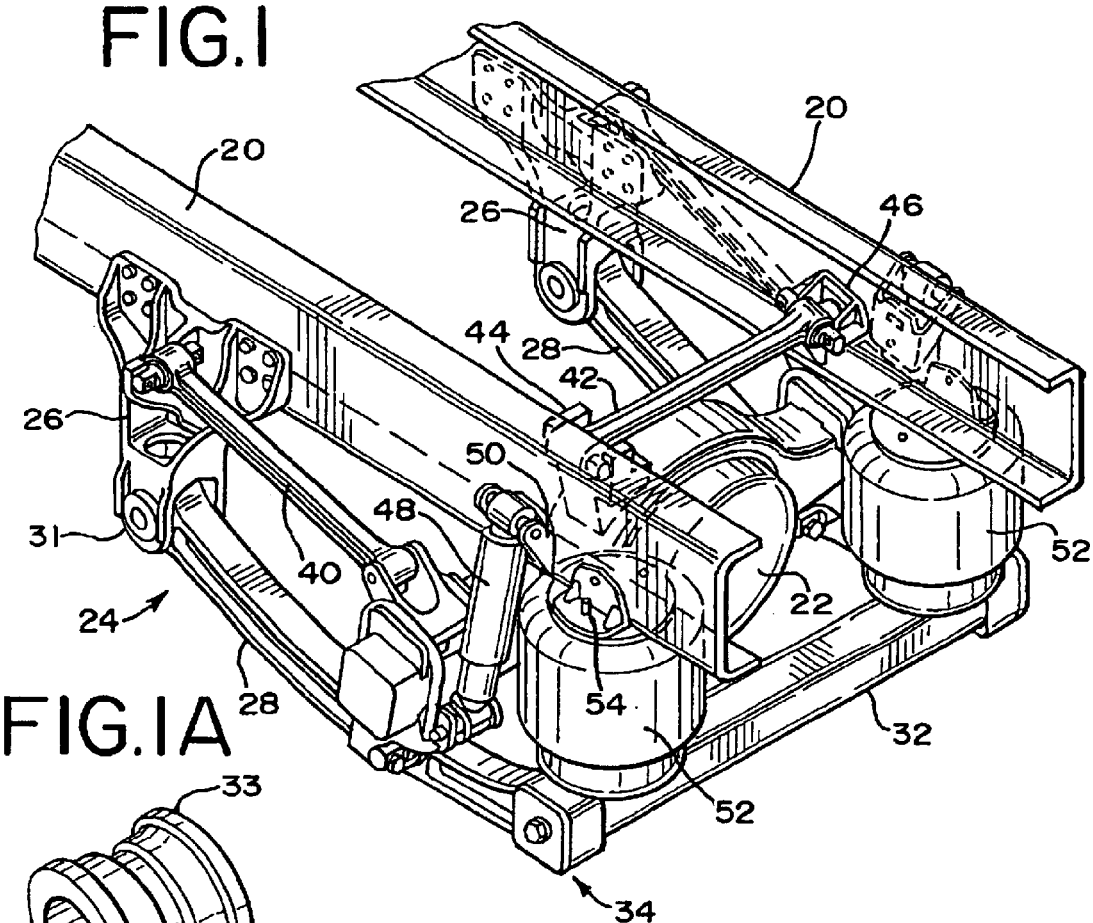
FIG.1
FIG.1A
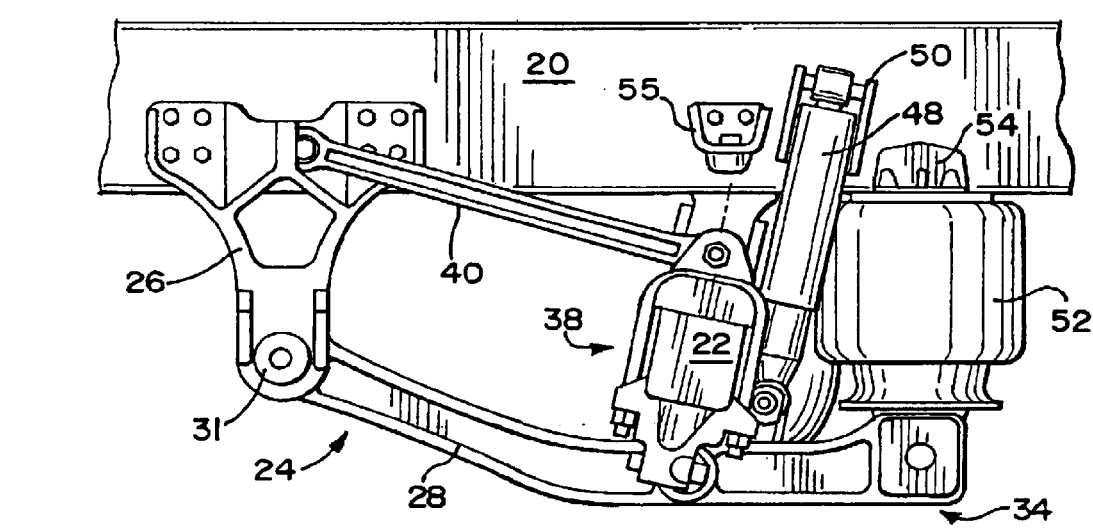
FIG.2

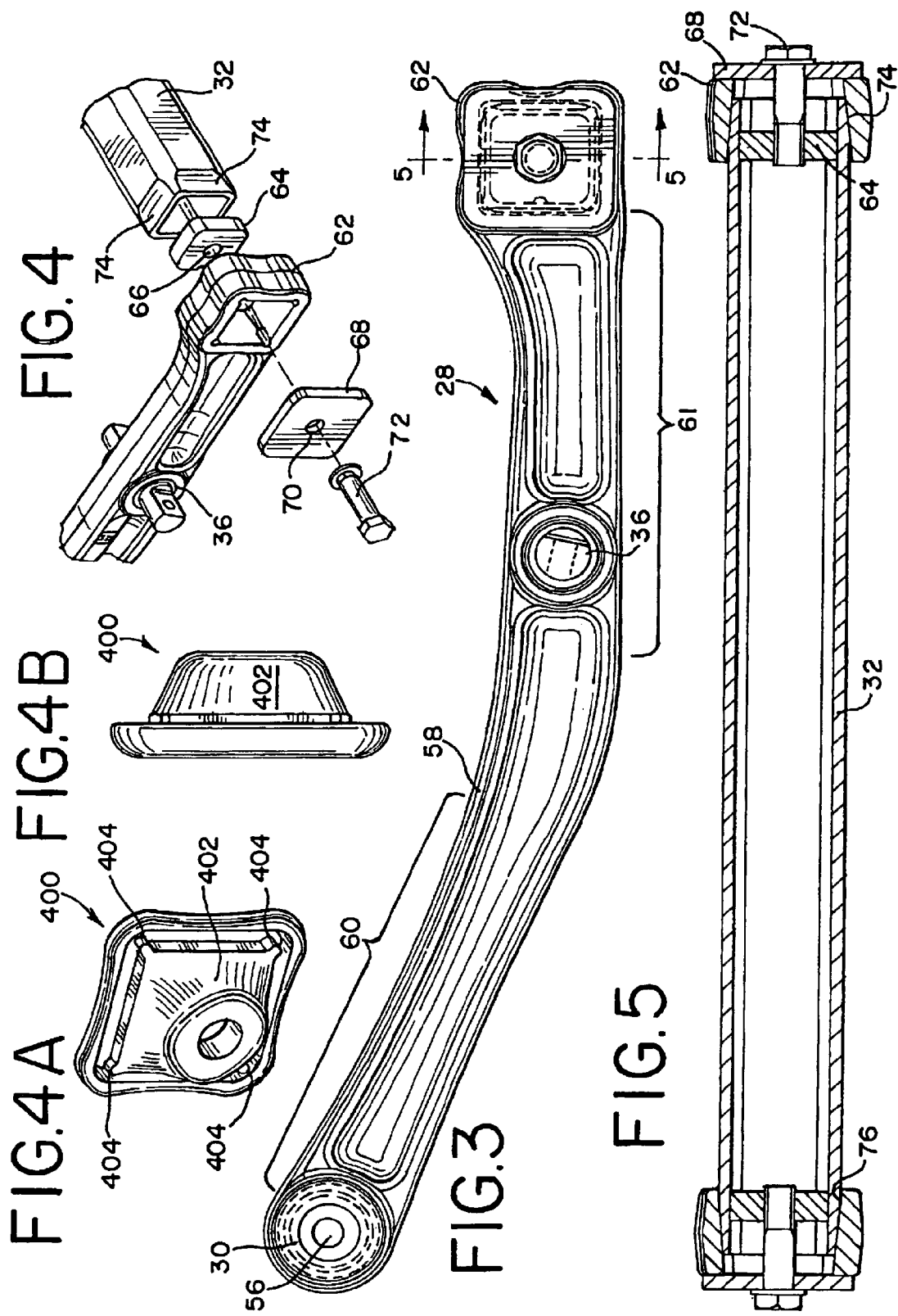

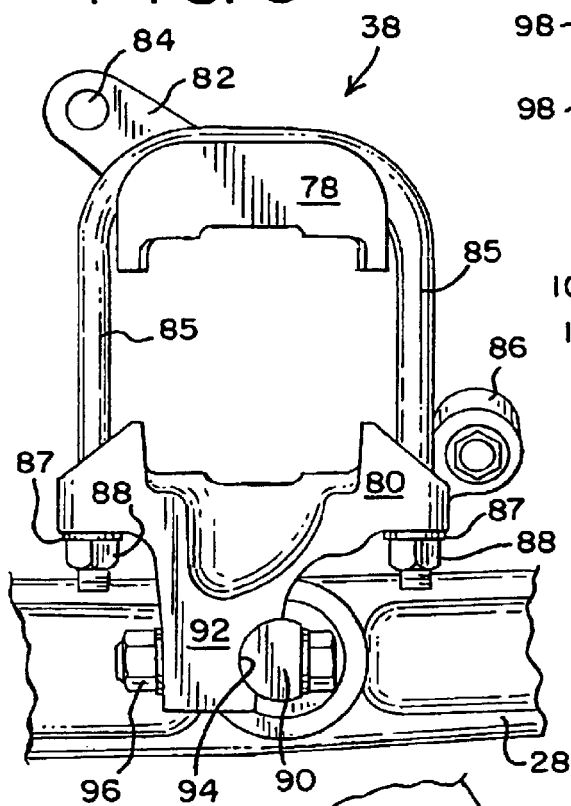
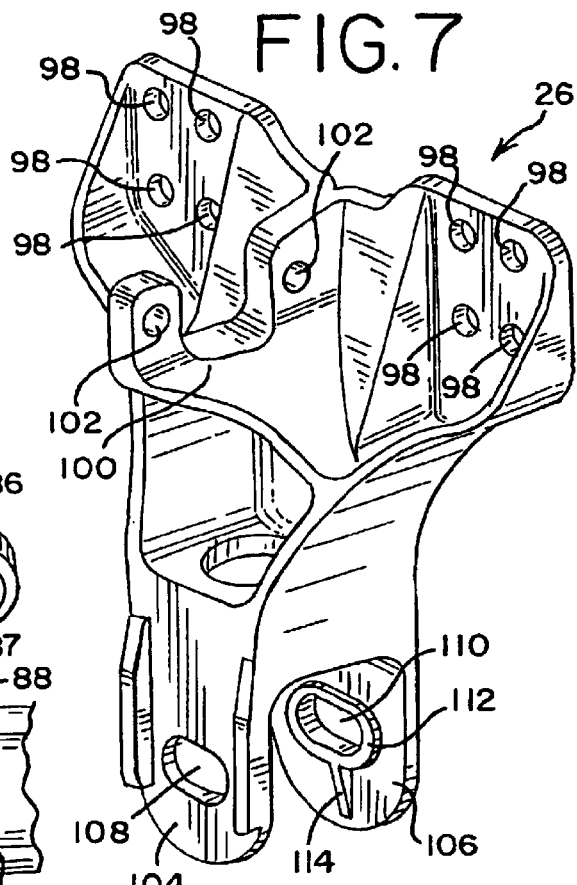
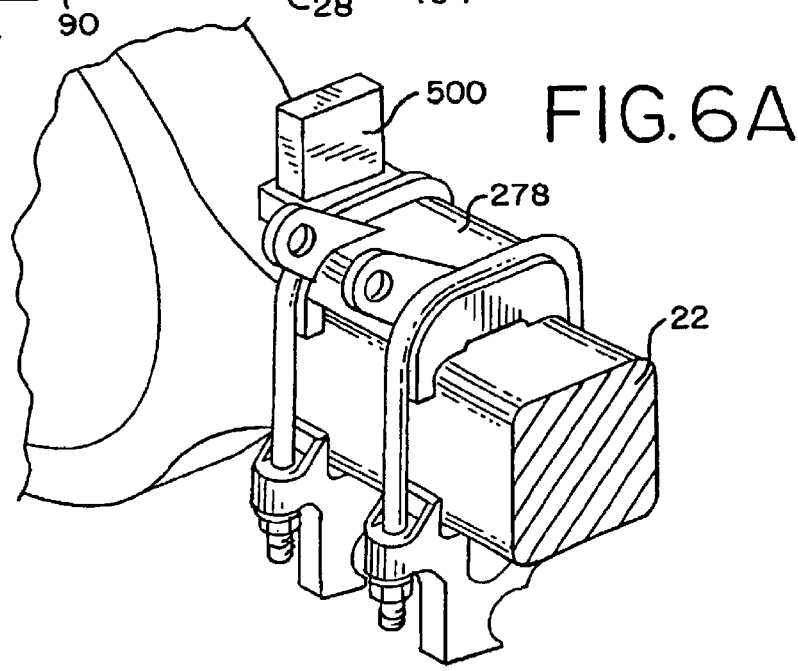

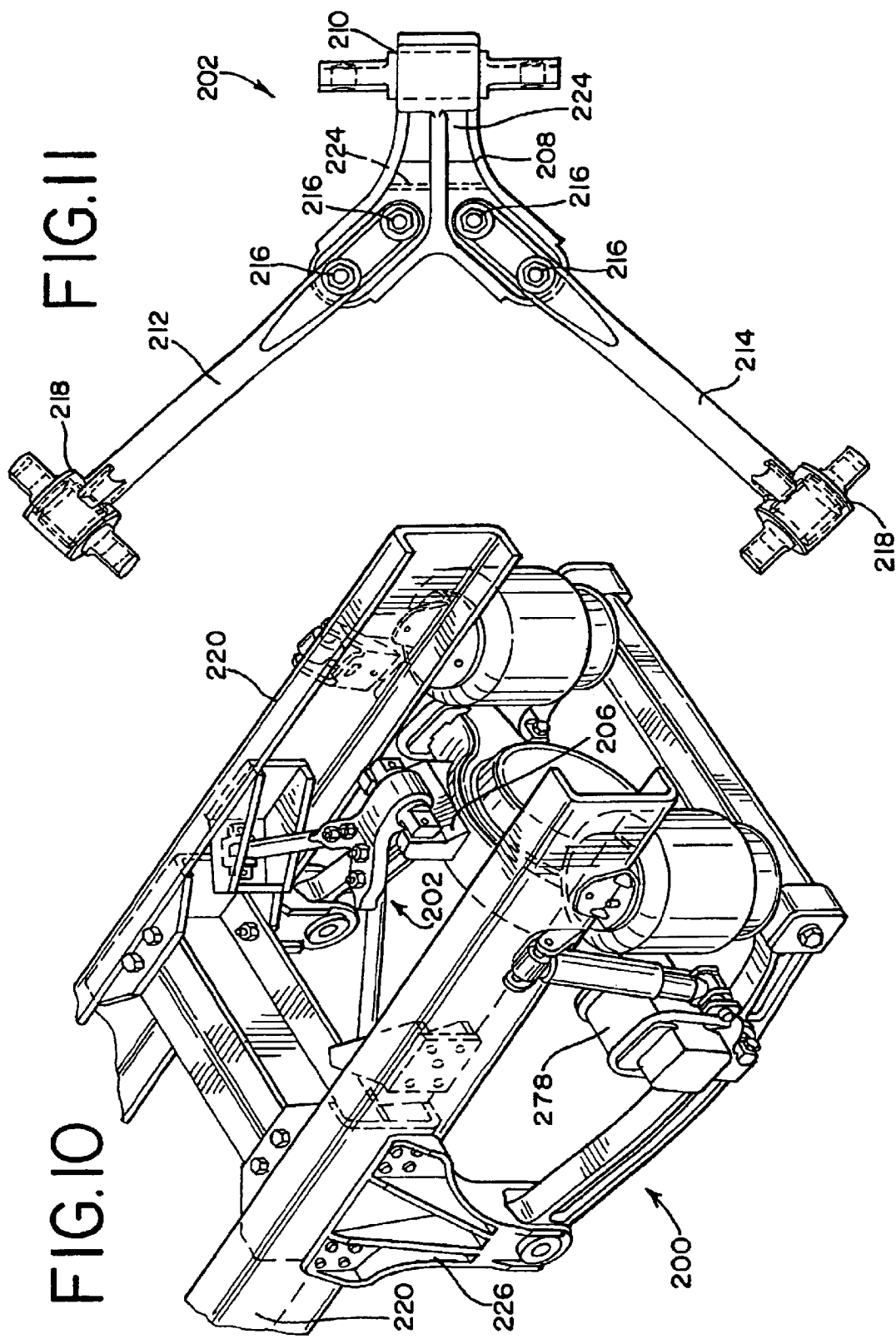

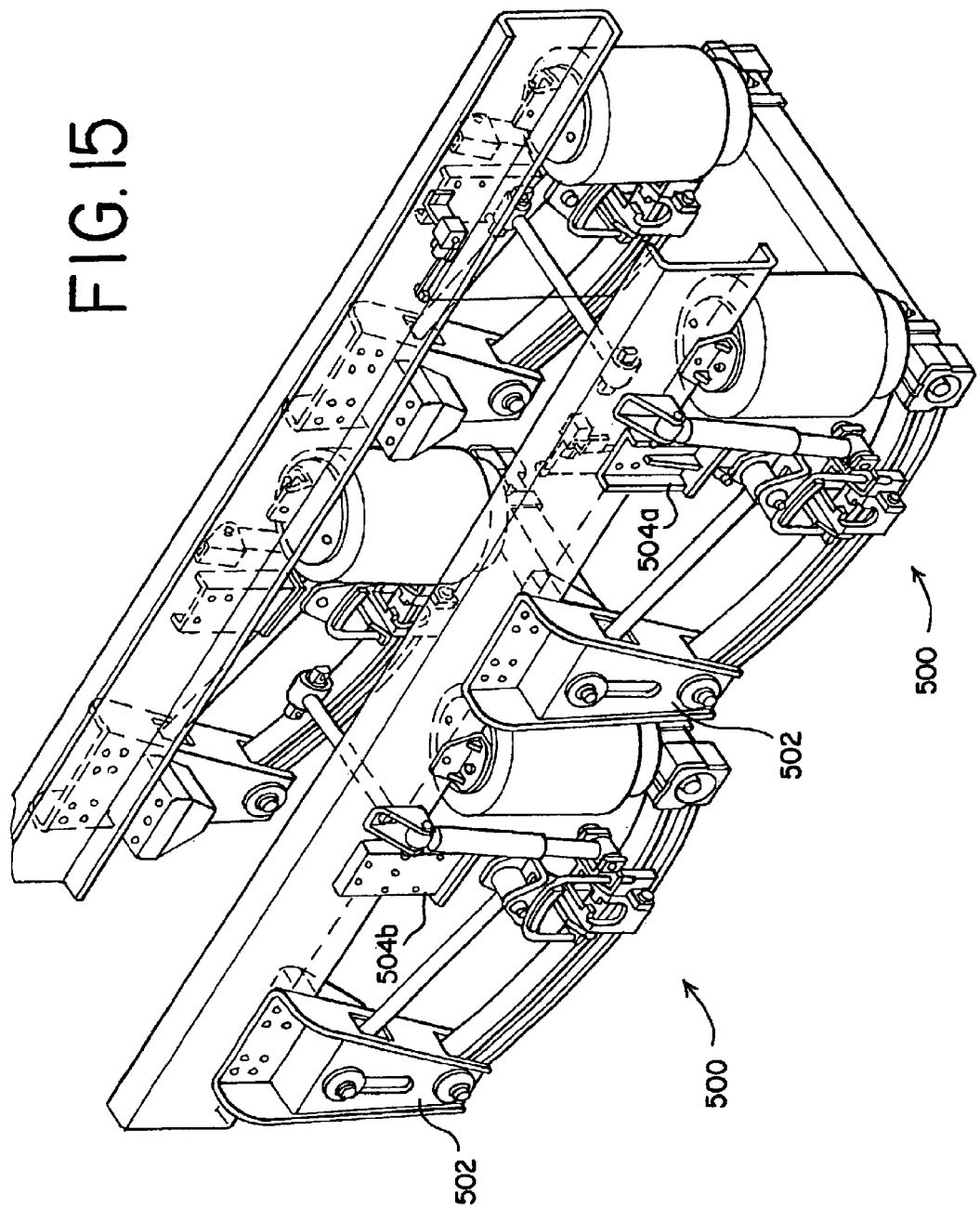

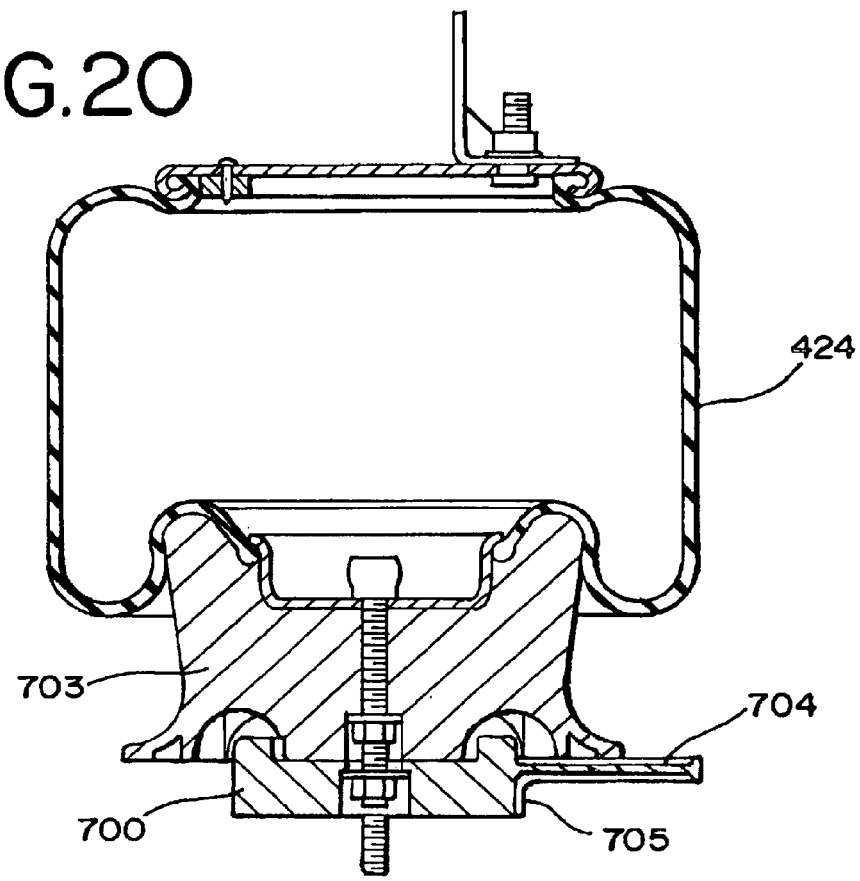
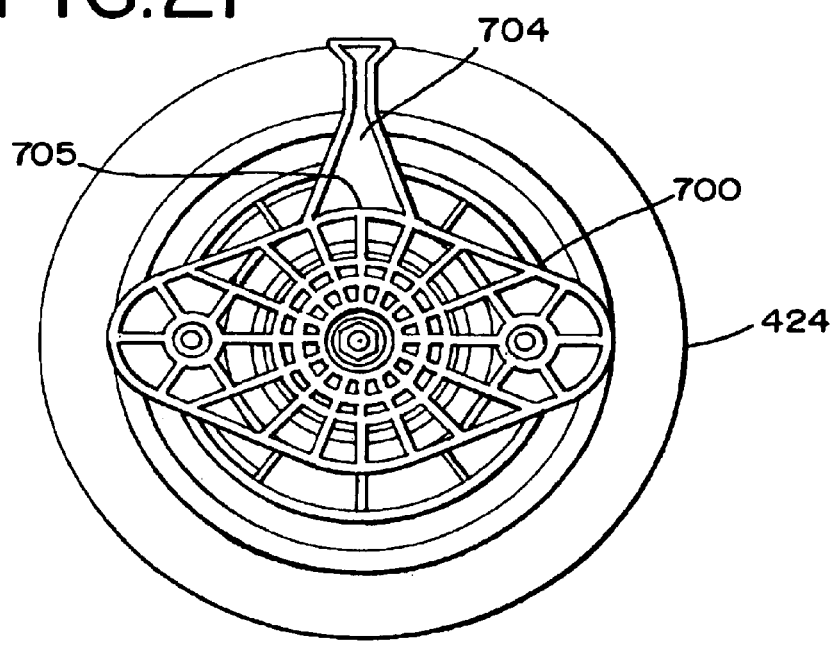

AIR SPRING AND AIR SPRING MOUNTING ASSEMBLY

CROSS-REFERENCE TO RELATED APPLICATIONS

This application is a continuation of PCT/US02/05351, filed Feb. 21, 2002 which is a continuation-in-part of U.S. Ser. No. 09/793,740, filed Feb. 26, 2001 now U.S. Pat. No. 6,851,689, and hereby claims the benefit of priority of that application. Additionally, the complete disclosure of U.S. Ser. No. 09/793,740, filed Feb. 26, 2001, is hereby incorporated herein by reference.

BACKGROUND OF THE INVENTION

The present invention relates generally to innovations and improvements in vehicle suspensions. More particularly, the present invention relates to a new and improved vehicle suspension that does not react significantly to torsional forces produced by high-torque drivetrain such as those utilized in heavy-duty trucks and the like, yet exhibits excellent ride and handling characteristics.

For several reasons, including use of higher horsepower engines and advances in engine technology, there have been increases in the torque output of heavy-duty truck engines. Such increases have magnified the problems of driveline vibration associated with trailing arm air suspensions, which are inherently torque reactive. When increased torque is applied to the axle of a truck equipped with such a torque reactive suspension, such as during acceleration, the frame of the truck rises up and away from the drive axle. This condition is known and referred to in the art as "frame rise".

It has been found that driveline vibration in vehicles, particularly heavy-duty trucks, is generally proportional to the severity of frame rise and wheel hop, and vice versa. Further, it has been found according to this invention that means for and methods of preventing or minimizing frame rise will result in suppressing driveline vibration and wheel hop.

Various non-reactive drive axle suspensions are known in the art. The term "non-reactive" means that the suspension does not react appreciatively to torque applied to a drive axle, particularly during acceleration and deceleration (braking).

Various roll stable suspensions are also known in the art. The term "roll stable" means that a suspension adequately resists the tendency of a vehicle to roll when negotiating sharp turns. A suspension exhibiting that feature is said to have roll stability.

Various air suspensions are also known. The term "air suspension" refers to a suspension equipped with air springs or bellows for supporting a vehicle on an axle.

Before the present invention, the various known air suspensions have not adequately managed the mobility versus stability tradeoff. Most air suspensions that are adequately roll stable do not provide adequate mobility. Conversely, most air suspensions that provide mobility do not provide sufficient roll stability. Further, such suspensions have reduced the comfort and ride characteristics of the suspension.

It is also desirable for a suspension to maintain the axle inclination angle or "pinion" angle throughout the full range of axle travel. By doing this, the axle pinion angle will more closely match the drive shaft angle and by so doing minimizes driveline vibration. The parallelogram geometry created by the beam and control rod maintains the pinion angle where a trailing arm suspension does not.

These prior art non-torque reactive suspensions are also generally heavy, translating into reduced payload capacity in commercial vehicle applications. Such suspensions are also generally expensive to manufacture in terms of increased component parts and they require lengthy installation and assembly time, which further increases their manufacturing expense. The prior art non-torque reactive suspensions also have generally low roll stability, thereby limiting use of the vehicle to certain, limited applications.

In light of the foregoing, it is desirable to design a vehicle suspension that will overcome one or more of the above-identified deficiencies of conventional non-torque reactive suspensions.

It is further desirable to design a vehicle suspension that is non-torque reactive.

It is further desirable to design a vehicle suspension that is a non-torque reactive air suspension.

It is further desirable to design a vehicle suspension that minimizes loads into the vehicle frame and its associated cross member.

It is further desirable to design a non-torque reactive suspension that exhibits excellent roll stability characteristics.

It is further desirable to design a non-torque reactive suspension that does not compromise ride and/or articulation characteristics, while providing excellent roll stability.

It is further desirable to design a vehicle suspension that minimizes the number of components required to achieve its objectives.

It is further desirable to design a vehicle suspension that can be assembled and installed in a relatively short amount of time.

It is further desirable to design a vehicle suspension that is relatively light in weight, thereby translating into increased payload capacity when used in commercial vehicle applications.

It is further desirable to provide a rear drive axle air suspension suitable for applications requiring partial off highway operation.

It is further desirable to design a vehicle suspension that is rated from 20,000 lb. to 23,000 lb. ground load per axle.

It is further desirable to design a vehicle suspension that can be used in connection with a variety of axle configurations, including single, tandem, or tridem axle configurations.

It is further desirable to design a vehicle suspension that is a non-reactive suspension developed for heavy-duty vehicles with high torque engines.

It is further desirable to design a vehicle suspension that minimizes vibration.

It is further desirable to design a vehicle suspension that improves ride quality.

It is further desirable to design a vehicle suspension that eliminates torque reactivity.

It is further desirable to design a vehicle suspension that includes various unique torque rod design configurations.

It is further desirable to provide a vehicle suspension that has an optimized parallelogram geometry.

It is further desirable to design a vehicle suspension that does not induce roll generated torque into the drive axle of a vehicle.

It is further desirable to design a vehicle suspension that includes a machine tapered joint for the connection between the longitudinally extending main beam sections and the laterally extending crossbrace.

It is further desirable to design a vehicle suspension that utilizes a D-shaped bar pin bushing for attachment to a single leg of the lower axle bracket used to connect various suspension components to the clamped drive axle housing.

It is further desirable to design a vehicle suspension that includes an axle clamp assembly bottom pad having shock and main beam bushing mounting structure for adjustment of the axle pinion angle.

It is further desirable to design a vehicle suspension that utilizes frame hanger components with integrated main beam and control rod mounting features.

It is further desirable to design a vehicle suspension that utilizes an axle clamp assembly top pad having integrated control mounting and bump stop features.

It is further desirable to design a vehicle suspension that includes roll stiffness tuning capability.

It is further desirable to design a vehicle suspension having features that aid in the assembly of the bushing interface.

It is further desirable to design a vehicle suspension having a geometry that eliminates axle pinion angle change throughout the range of vertical axle travel.

It is further desirable to design a vehicle suspension having a geometry with links connected both above and below the axle to resist axle torsional displacements that are generated by braking and acceleration.

It is further desirable to design a vehicle suspension having a parallel geometry that reduces driveline vibration relative to typical trailing beam style suspensions common in the industry.

It is further desirable to design a vehicle suspension having a parallel geometry that reduces driveline vibration relative to typical trailing beam style suspensions common in the industry.

It is further desirable to design a vehicle suspension that has an alternative geometry replacing two longitudinal and one lateral control rod with a single V-rod configuration that forms the upper linkage in the parallelogram geometry of the suspension and supports lateral loads.

It is further desirable to design a vehicle suspension that has pivotal connections at the axle rather than rigid connections such that no torsional loads are transmitted into the axle, making the axle interface more robust than the typical rigid connection.

It is further desirable to design a vehicle suspension that eliminates the axle as an auxiliary roll-stabilizing component, yet obtains roll stability through various components of the suspension.

It is further desirable to design a vehicle suspension that prevents vehicle frame rise.

It is further desirable to design a vehicle suspension wherein the pivot for connecting other suspension components to the frame hanger is approximately aligned with the axle pivot.

These and other benefits of the preferred forms of the invention will become apparent from the following description. It will be understood, however, that an apparatus could still appropriate the invention claimed herein without accomplishing each and every one of these benefits, including those gleaned from the following description. The appended claims, not the benefits, define the subject matter of this invention. Any and all benefits are derived from the preferred forms of the invention, not necessarily the invention in general.

BRIEF SUMMARY OF THE INVENTION

The present invention is directed to a non-torque reactive air suspension exhibiting excellent ride and handling characteristics. The suspension includes frame hangers mounted to frame rails extending longitudinally on opposite sides of a vehicle. Longitudinally extending beams are connected to the frame hangers at one end and extend parallel to the frame rails. At their other ends, the beams are joined by a crossbrace extending laterally across the vehicle centerline. In a central portion thereof, the beams have an axle pivot bore to which an axle clamp assembly is connected, the axle clamp assembly clamping a drive axle housing for the vehicle. The axle pivot bore is generally aligned with the drive axle. A control rod assembly is connected to suspension or frame components. Together with the beams, the control rod assembly forms a parallelogram configuration wherein the beams form the lower linkages of that configuration and the control rods included within the control rod assembly form the upper linkages of that configuration.

In a preferred aspect, the frame hangers include control rod mounting features. These features permit the incorporation of longitudinally extending control rods outboard of the vehicle frame rails. The frame hangers also preferably include features that facilitate installation and assembly of the suspension components, specifically the beams.

In another preferred aspect, the top pad for the axle clamp assembly includes control rod mounting features. These features also permit the incorporation of longitudinally extending control rods outboard of the vehicle frame rails. The top pad also preferably includes a bump stop.

In still another preferred aspect, the bottom pad for the axle clamp assembly includes a single leg having a curved surface to accommodate the curved portion of a D-shaped bar pin bushing that connects the axle clamp assembly to the beam through its axle pivot bore. This construction facilitates adjustment of axle pinion angle, as desired. The bottom pad also preferably includes shock damper mounting features.

In yet another preferred aspect, the connection assembly that joins the crossbrace at corresponding beam ends includes a machine taper joint and a square-like geometry, exhibiting excellent roll stability characteristic during vehicle operation.

In alternative embodiments, the suspension can include various control rod configurations, including a first having two longitudinally extending control rods mounted on the frame hanger and axle clamp assembly outboard of the vehicle frame rails and one laterally extending control rod mounted between the drive axle housing and one of the vehicle frame rails, a second having a V-rod configuration mounted at an apex to the drive axle housing and at each end to opposite ones of the vehicle frame rails, and a third having a single longitudinally extending control rod mounted between the drive axle housing and a frame cross member extending laterally and mounted to both vehicle frame rails and a single laterally extending control rod mounted to the drive axle housing and one of the vehicle frame rails.

BRIEF DESCRIPTION OF THE SEVERAL VIEWS OF THE DRAWING

In the following detailed description, reference will frequently made to the following figures, in which like reference numerals refer to like components, and in which:

FIG. 1 is a rear perspective view of a drive axle suspension for a heavy duty truck or the like constructed in accordance with the principles of the present invention;

FIG. 1A is a perspective view of a bushing used in the suspension shown in FIG. 1;

FIG. 2 is a side elevational view of the suspension shown in FIG. 1;

FIG. 3 is a side elevational view of one of the main beams used in the suspension shown in FIG. 1;

FIG. 4 is an exploded perspective view illustrating the connection between the main beam shown in FIG. 3 and the crossbrace used in the suspension shown in FIG. 1;

FIG. 4A is a rear perspective view of a retainer cup that can be used in the connection assembly shown in FIG. 4;

FIG. 4B is a side view of the retainer cup shown in FIG. 4A;

FIG. 5 is a sectional view of the main beam shown in FIG. 3 taken along line 5—5;

FIG. 6 is a side elevational view of a preferred form of the axle clamp assembly used in the suspension in FIG. 1;

FIG. 6A is a perspective view of an alternative form of the axle clamp assembly shown in FIG. 6;

FIG. 7 is a rear perspective view of the frame hanger assemby used in the suspension shown in FIG. 1;

FIG. 10 is a rear perspective view of the suspension shown in FIG. 1 having an alternative control rod configuration;

FIG. 11 is a top plan view of the alternative control rod configuration used in the suspension shown in FIG. 10;

FIG. 15 is a rear perspective view of yet another drive axle suspension for a heavy duty truck or the like constructed in accordance with the principles of the present invention;

FIG. 20 is an elevational view of an air spring assembly shown in section; and

FIG. 21 is a bottom view of the air spring assembly shown in FIG. 20.

DETAILED DESCRIPTION OF THE INVENTION

Figure 8:
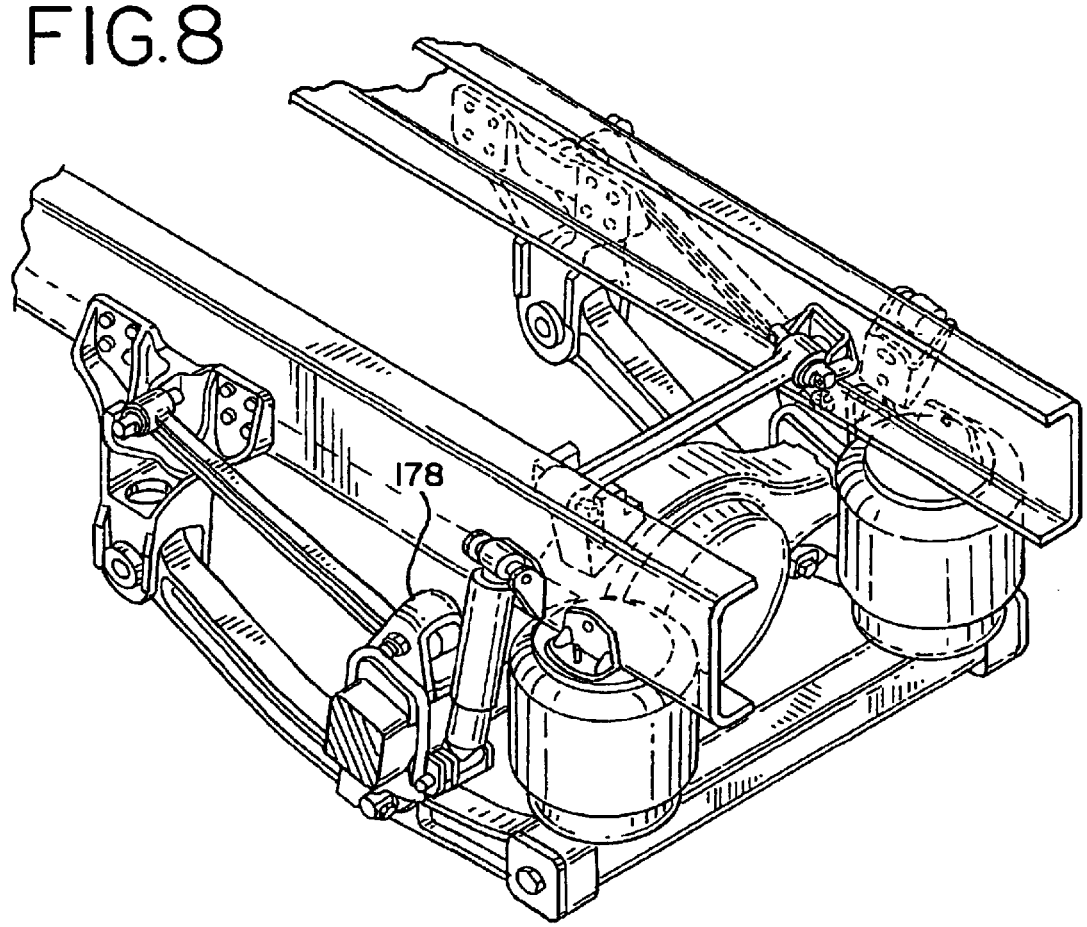
FIG. 8 is a rear perspective view of the suspension shown in FIG. 1 having its axle clamp assembly top pad substituted for an alternative preferred form of that component.

FIGS. 1 and 2 illustrate components used in association with a vehicle, such as a heavy-duty truck and the like (not shown). The vehicle includes longitudinally extending frame rails 20 positioned on opposite sides of the vehicle and having a preferred C-shaped configuration. The vehicle further includes a drive axle having a housing illustrated in FIG. 1 by reference numeral 22. The drive axle for the vehicle extends laterally across the vehicle and is used to mount tires (not shown) driven by a vehicle engine (not shown).

In addition to the foregoing, the vehicle further includes a suspension generally designated by reference numeral 24, which connects the drive axle housing 22 to frame rails 20—20 positioned on opposite sides of the vehicle.

As will be appreciated, with respect to suspension 24, the majority of the components positioned on one side of the vehicle will have correspondingly similar components positioned on the other side. Accordingly, in this description, when reference is made to a particular suspension component, it will be understood that a similar component is present on the opposite side of the vehicle, unless otherwise apparent.

Suspension 24 includes a plurality of components including frame hangers 26 mounted on opposite sides of the vehicle to frame rails 20—20. Suspension 24 further includes longitudinally extending main beams 28—28 connected at one end to a frame hanger 26 through a bushing 30 (see FIG. 1A) and an eccentric washer or member 31, which allows axle adjustment for the suspension. At the other end, beams 28—28 are connected to a laterally extending crossbrace 32 by way of a beam-to-brace connection assembly 34. As shown, a single crossbrace is utilized for each axle using the suspension 24 illustrated in FIG. 1. As such, crossbrace 32 extends laterally across the vehicle to connect with the rearward ends of the beams 28—28 positioned on opposite sides of the vehicle.

Crossbrace 32 forms a semi-torsion bar which lifts and rotates while resisting moments about all three axes of a Cartesian coordinate system. Crossbrace 32 is the primary component contributing to roll stability for suspension 24.

A secondary component for the roll stability of suspension 24 is the bushing 30 that is used to connect beam 28 with frame hanger 26. Bushing 30, illustrated in FIG. 1A, preferably is a sleeveless bushing and has an outer rim surface 33 on each end thereof trapped and compressed between the beam and the inner walls of the depending panels of the frame hanger when the bushing is installed within the bore positioned at the forward end of beam 28 and beam 28 is connected to frame hanger 26. As such, this outer surface 33 of bushing 30 reacts against vehicle roll as the vehicle negotiates sharp turns and the trapped conical rate of the bushing provides additional roll stability.

Between their ends, beams 28—28 include an axle pivot bore 36 (see FIG. 3), which permits an axle clamp assembly generally designated by reference numeral 38 to connect the drive axle housing 22 to each beam 28 for pivotal movement. The axle pivot bore 36 is positioned at the center of the drive axle. The combination of beam and control rod linkages to the axle make the suspension non-reactive. Details of the axle clamp assembly 38 are set forth in further detail in the description regarding other figures of the drawing.

Further shown in FIGS. 1 and 2 is a longitudinally extending control or torque rod 40 that is connected between frame hanger 26 and a component part of axle clamp assembly 38. As such, two longitudinal torque rods 40—40 are included within suspension 24, each positioned on an opposite side of the vehicle. Together, torque rods 40 and beams 28 form a parallelogram geometry that contributes to the desired characteristics exhibited by suspension 24. The optimized geometry distributes loads between the torque rods 40 and beams 28 so that they are shared. The load distribution, handling characteristics and roll stability of suspension 24 can be tuned by varying the geometry thereof.

Similarly, a laterally extending control or torque rod 42 is included within suspension 24 and connected between drive axle housing 22 and frame rail 10 on one side of the vehicle. Laterally extending torque rod 42 extends in a direction generally transverse to the direction in which longitudinally extending torque rods 40—40 extend. Accordingly, laterally extending torque rod 42 can also be referred to as a transverse torque rod.

An axle housing control rod mounting bracket 44 is mounted to drive axle housing 22 in order to permit the laterally extending torque rod 42 to connect to the drive axle housing. Similarly, a frame rail control rod mounting bracket 46 is mounted to frame rail 10 on one side of the vehicle to permit laterally extending torque rod 42 to connect to the frame rail on which it mounts.

Suspension 24 further includes a shock damper 48 connected at its upper end to an upper shock bracket 50 mounted to frame rail 20 and at its lower end to the axle clamp assembly 38, as discussed in further detail in the description regarding other figures of the drawing. Suspension 24 further includes air springs 52—52 connected at their respective top ends to an air spring mounting bracket 54 that is mounted to frame rail 20. Air springs 52 are positioned on crossbrace 32 in a manner known in the art such as by being seated on a conventional, suitable air spring mounting pad (not shown).

Figure 13:
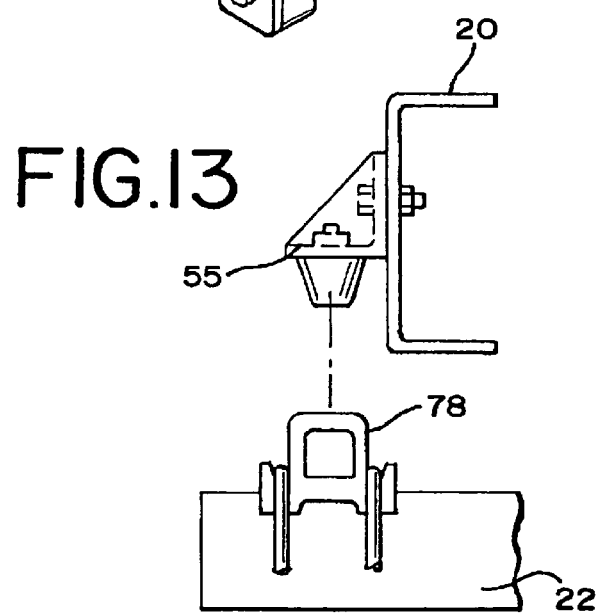
FIG. 13 is a rear view illustrating features of the suspension shown in FIG. 2.

FIG. 2 and FIG. 13 also illustrate an outboard bump stop 55 mounted on frame rail 20. As will be understood by those skilled in the art, in certain applications, air will be exhausted from the suspension to ride on bump stops. For instance, this is done to increase vehicle stability during events such as tipping a dump body to unload. The top pad 78 will strike bump stop 55 during jounce and the vertical load will pass through the top pad directly into the clamped drive axle. Top pad 178 of FIG. 9 could also be used for this purpose.

FIG. 3. illustrates one of the longitudinally extending beams 28 used in the suspension 24 depicted in the FIG. 1. As shown, beam 28 includes a bore 56 positioned at one end thereof in order to permit installation of bushing 30 (FIG. 1A) and attachment of beam 28 to frame hanger 26 (FIG. 1). From that end, beam 28 extends downwardly at a relatively continuous angle towards a point 58 to define a section 60 of the beam. From point 58, beam 28 curves upwards towards a direction where it travels along a relatively straight and horizontally extending path to define a section 61 of the beam. Beam 28 obtains the horizontally extending path at or near the axle pivot bore 36 located in a central, rearward portion of the beam. From axle pivot bore 36, beam 28 extends generally horizontally to an open, square-like end 62 designed to receive and permit connection with the crossbrace 32 depicted in FIG. 1.

FIGS. 4 and 5 illustrate the connection assembly 34 used to connect the end of each longitudinally extending beam 28 with an associated end of crossbrace 32 to establish a joint between same. During operation of suspension 24, it will be appreciated that this joint will be subjected to high bending moments about all three axes of a three dimensional Cartesian coordinate system.

Connection assembly 34 preferably includes a plug component 64 having a bore 66, a retainer plate 68 also having a bore 70, and a fastener 72. Plug component 64 is secured within the interior of hollow crossbrace 32. It will be appreciated that in an alternative arrangement plug component 64 could be integrally formed with crossbrace 32 during the manufacturing process.

Retainer plate 68 is brought into contact with the outboard, square-like surface of end 62 of beam 28 to axially align bores 66, 70. Once aligned, fastener 72 is inserted through bores 66, 70 and the joint is formed between beam 28 and crossbrace 32 by drawing the crossbrace end towards the beam end. It will be appreciated that bore 66 can be tapped in order to facilitate formation of the joint between beam 28 and crossbrace 32. Other fastening arrangements can also be used.

Still referring to FIGS. 4 and 5, crossbrace 32 includes inwardly tapered surfaces 74 defining the walls at each end. Similarly, the square-like end 62 of beam 28 has a tapered surface 76 defining each of its inner walls. Preferably, the tapered surfaces 74, 76 form a six degree angle. Inwardly tapered surfaces 74 of crossbrace 32 and inwardly tapered surfaces 76 of beam 28 are designed to allow corresponding ones of the surfaces to mate and cause frictional contact during vehicle operation. This frictional contact and squared geometry of the joint resists the torsional loads about the lateral axis of crossbrace 32. This characteristic provides exceptional roll stability for suspension 24. FIG. 5 does not illustrate the air spring mounts positioned in close proximity to the ends of crossbrace 32. However, it will be appreciated that such mounts are positioned at those locations.

FIGS. 4A and 4B illustrate a retainer cap 400 used in lieu of the retainer plate 68 shown in FIGS. 4 and 5. Retainer cap 400 is a casting having a cavity 402 that allows the fastener bolt head to be recessed, which provides increased tire clearance. Additionally, the retainer cap 400 includes bumps 404 positioned on the inboard side in each of its four corners to engage the corresponding corner of beam 28 and properly index the cap, while preventing it from rotating.

FIG. 6 illustrates axle clamp assembly 38 having a top pad 78 and a bottom pad 80. Top pad 78 includes two projecting ears 82 having bores 84 extending through them. As shown in FIG. 1, longitudinally extending torque rod 40 can connect to axle clamp assembly 38, and particularly to top pad 78, by use of this structure. In that regard, a through bolt or the like can be inserted through axially aligned bores 84 to permit connection with longitudinally extending torque rod 40. In a conventional arrangement, top pad 78 includes grooved surfaces (not shown) designed to receive U-bolts 85 and permit clamping of the drive axle housing. U-bolts 85 are preferably three-quarter inch.

FIG. 6A illustrates an axle clamp assembly having a top pad 278 that includes the control rod mounting feature, described above. Top pad 278 also includes a bump stop 500 positioned inboard that will hit the underside of the frame rail during jounce and pass vertical load directly into the drive axle housing. As shown, bump stop 500 is integrated with top pad 278, which desirably reduces the number of suspension component parts.

Referring back to FIG. 6, bottom pad 80 includes a lower shock bracket 86 integrally formed therewith. Lower shock bracket 86 permits attachment of the lower end of a shock damper such as shock damper 48 illustrated in FIG. 1. As such, the shock damper can be connected between axle clamp assembly 38 and the vehicle frame rail. As shown, bores 87 are machined or cast into bottom pad 80 to allow U-bolts 85 to clamp the vehicle drive axle housing. Fasteners 88 are threaded onto the ends of U-bolts 85 to clamp the axle housing between the top pad 78 and bottom pad 80 of axle clamp assembly 38.

Bottom pad 80 is pivotally connected to longitudinally extending beam 28 by a D-shaped bar pin bushing 90, which is received within axle pivot bore 36. Bottom pad 80 includes a lower portion 92 defining a single leg and having a curved surface 94 that receives the curved portion of D-shaped bar pin bushing 90. Lower portion 92 also has a bore machined through it that is brought into registration with the bore machined into D-shaped bar pin bushing 90. Fastener assembly 96 includes a rod-like element that extends through the bore machined through lower portion 92 of bottom pad 80 and the bore machined through D-shaped bar pin bushing 90. Fastener assembly 96 is then fastened to connect the clamped drive axle housing to longitudinally extending beam 28, and bear against the flat surface of D-shaped bar pin bushing 90. Through this arrangement, the axle pinion angle can be readily adjusted.

FIG. 7 illustrates a frame hanger 26 preferably used in the suspension 24 illustrated in FIG. 1. As shown, frame hanger 26 preferably includes mounting bores 98, which permit the frame hanger to be mounted to a vehicle frame rail. Frame hanger 26 further includes a control rod mounting flange 100 having bores 102 machined through it to permit connection with a longitudinally extending torque rod 40 by use of a bar pin or the like. Accordingly, frame hanger 26 includes control rod mounting features integrated therewith, which provides a natural path for longitudinal loads from the axle to the frame.

Referring still to FIG. 7, another unique aspect of frame hanger 26 is structure that facilitates installation and connection of the bushing 30 (FIG. 1A) used to connect an end of longitudinally extending beam 28 to the frame hanger. In that regard, frame hanger 26 includes two depending panels 104, 106 each having a bore 108, 110 machined through it. An inwardly projecting surface 112 is disposed around the perimeter of bore 110 of depending panel 106. In similar fashion, an inwardly projecting surface (not shown) is disposed around the perimeter of bore 108 of depending panel 104. An inwardly tapering surface 114 extends from the inner wall of depending panel 106 to inwardly projecting surface 112. Similarly, an inwardly tapering surface (not shown) extends from the inner wall of depending panel 104 to the inwardly projecting surface that is disposed about the perimeter of bore 108. As will be appreciated by those skilled in the art, this construction greatly facilitates assembly of the longitudinally extending beam 28 to frame hanger 26 by allowing the bushing to be positioned in registration with bores 108, 110 more readily.

Ideally, bores 108, 110 are aligned vertically with axle 22 to provide optimum performance of suspension 24. As hanger 26 hangs lower, however, it is greater in weight, provides less clearance, and requires more expense to manufacture. In any event, the characteristics of suspension 24 can be tuned by varying the position of the main beam pivot vis-a-vis the axle pivot.

To assemble the components illustrated in FIGS. 1 and 2, frame hangers 26, frame rail control rod mounting brackets 46 and upper shock damper mounting brackets 50 are mounted to frame rails 20 to form a frame subassembly. The axle clamp assembly 38 is then clamped to drive axle housing 22, while beams 28 are connected to crossbrace 32 and connected to the axle clamp assembly by D-shaped bar pin bushing 90. The longitudinally extending control rods 40 are connected to the top pads 78 for each axle clamp assembly 38, and the laterally extending control rod 42 is connected to the axle housing control rod mounting bracket 44 mounted on drive axle housing 22 to form an axle subassembly. Thereafter, the axle subassembly is installed into the frame subassembly. Finally, the eccentric washer or member 31 is rotated clockwise or counter-clockwise to move the drive axle forward or rearward, as desired. Further, drop in shims (not shown) can be added at the longitudinal torque rod and frame hanger interface, as desired.

FIG. 8 also illustrates a vehicle suspension having a geometry identical to that shown in FIG. 1. In the suspension shown in FIG. 8, the axle clamp assembly includes a top pad 178 having a different construction from that depicted in FIGS. 1, 2 and 6.

Figure 9:
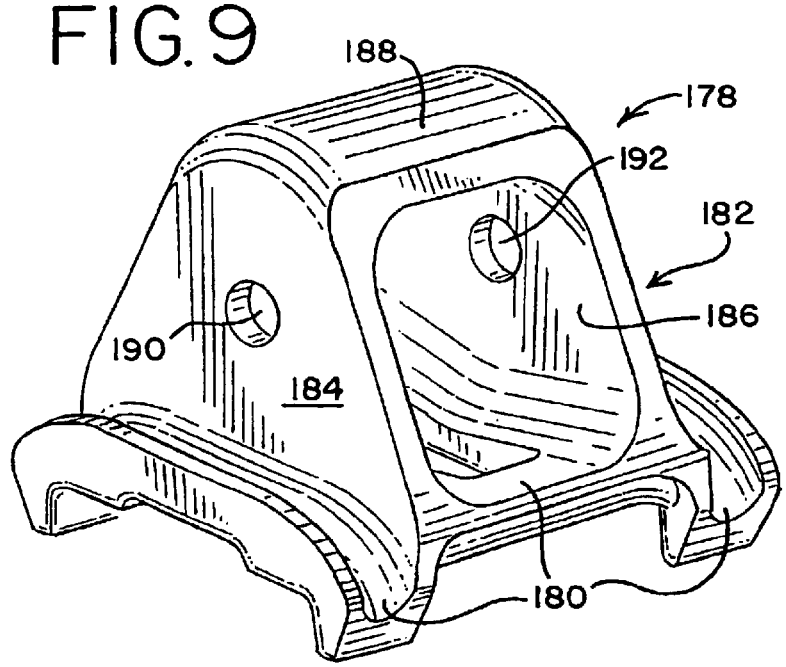
FIG. 9 is a rear perspective view of the axle clamp assembly top pad included within the suspension shown in FIG. 8.

Referring to FIG. 9, top pad 178 includes an axle clamp base portion 180 and a control rod mounting portion generally designated by reference numeral 182. Control rod mounting portion 182 includes two ear-like sidewalls 184, 186 and a curved top wall or dome surface 188, which can serve as a bearing surface that strikes a bump stop mounted on the vehicle frame rail. Openings exist between sidewalls 184, 186 at opposite ends of the top pad to permit entry of a control rod.

Sidewall 184 includes a bore 190 machined or cast through it. Similarly, sidewall 186 includes a bore 192 machined or cast through it. Bores 190, 192 are in registration such that a pin can extend between them and through a bore positioned at one end of a longitudinally extending control rod such as control rod 40 depicted in FIG. 8. Accordingly, similar to the top pad 78 shown in FIG. 6, top pad 178 has control rod mounting features intergrated therewith. As will be appreciated, top pad 178 might be more structurally sound, but top pad 78 is lighter in weight because it ordinarily would require less material.

FIG. 10 illustrates a suspension generally designated 200 that utilizes a V-shaped control rod configuration defined by a V-shaped control rod assembly generally designated 202. In that regard, frame hanger 226 and top pad 278 can be conventional in design, and need not have control rod mounting features associated and intergrated therewith. V-shaped control rod assembly 202 connects to frame rails 220 by way of frame brackets 204 mounted thereon, and further connects with drive axle housing 222 by way of a bracket 206 mounted on the housing. It will be appreciated by those skilled in the art that V-shaped control rod assembly 202 reacts to both lateral and longitudinal forces produced during vehicle operation, and that it provides the upper links for the preferred parallelogram geometry used for the roll stable, non-torque reactive vehicle suspension of the present invention.

FIG. 11 illustrates V-shaped control rod assembly 202. Assembly 202 includes an apex component 208 having a bushing 210 for connection with bracket 206 on the drive axle housing 222. Assembly 202 further includes control rods 212, 214 fastened to apex component 208 by fasteners 216. Control rods 212, 214 include bushings 218 for attachment to frame brackets 204 mounted on opposing frame rails 222 that extend longitudinally along opposite sides of the vehicle. Apex component 208 includes two recessed portions 224 defining channels that permit connection with control rods 212, 214 and direct them along their desired path, orientating them towards frame rails 220.

Figure 12:
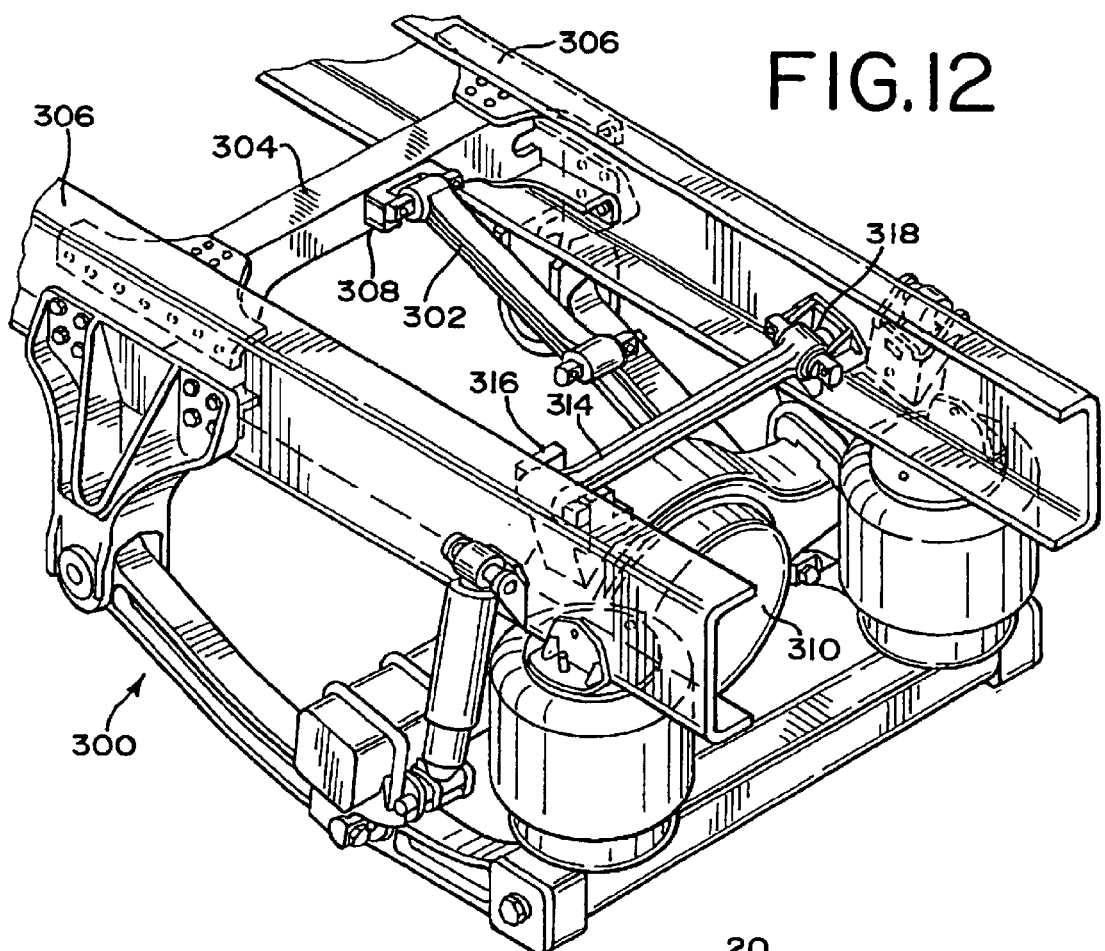
FIG. 12 is a rear perspective view of the suspension shown in FIG. 1 having yet another alternative control rod configuration.

FIG. 12 illustrates a suspension generally designated 300 that utilizes a two rod control rod configuration. In that regard, a longitudinally extending control rod 302 connects to a cross member 304 of frame rails 306 by way of a frame bracket 308 mounted to the cross member, and further connects with drive axle housing 310 by way of bracket (not shown) mounted on the housing. This connection is not shown to facilitate illustration of this control rod configuration. Similarly, a laterally extending control rod 314 connects to one frame rail 306 by way of a frame bracket 316 mounted thereon, and further connects with drive axle housing 310 by way of a bracket 318 mounted on the housing. It will be appreciated by those skilled in the art that control rod 302 reacts to longitudinal torque forces produced during vehicle operation, and control rod 314 reacts to lateral torque forces produced during vehicle operation. Together, control rods 302, 314 provide the upper links for the preferred parallelogram geometry used for the roll stable, non-torque reactive vehicle suspension of the present invention.

Figure 14:
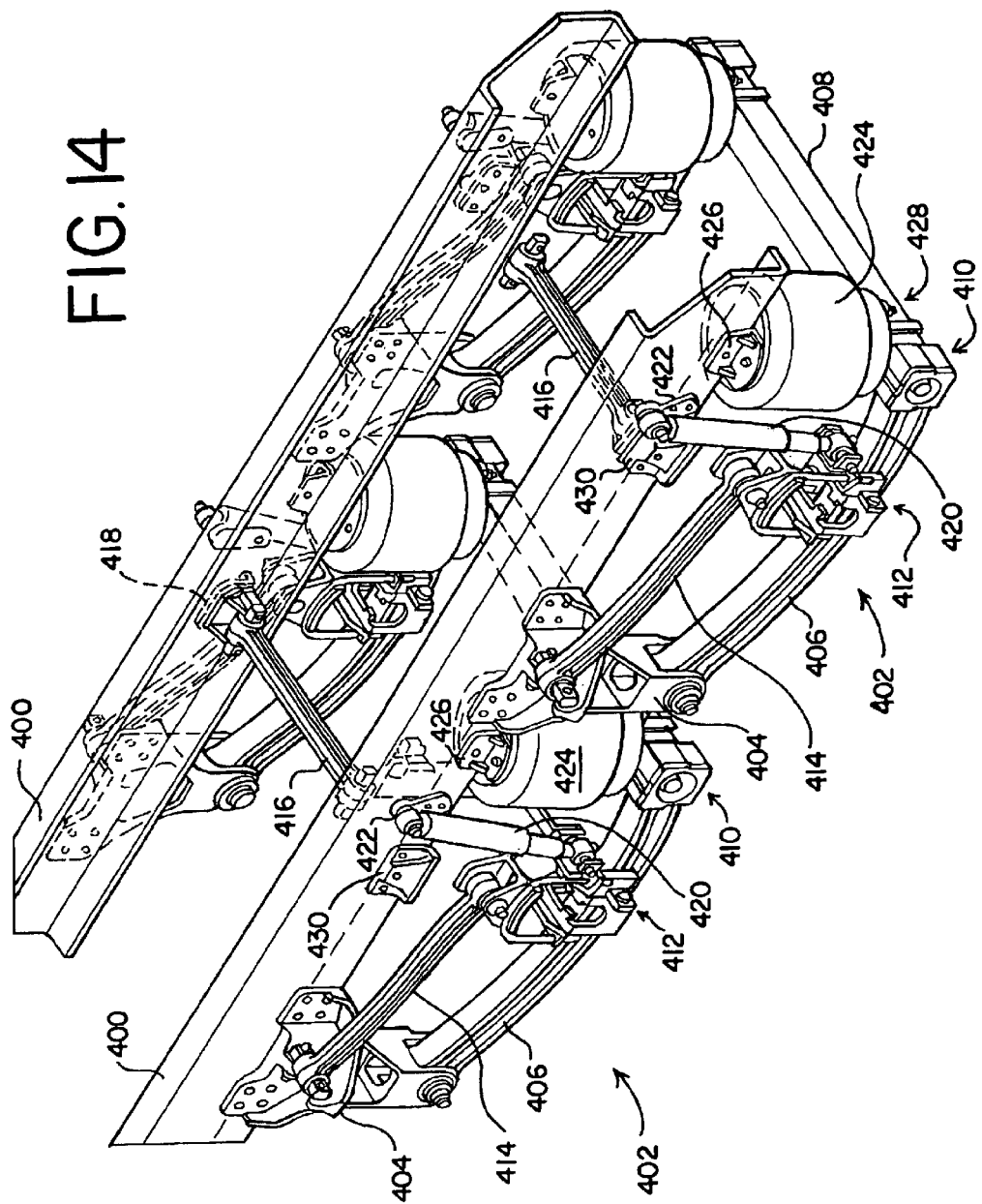
FIG. 14 is a rear perspective view of another drive axle suspension for a heavy duty truck or the like constructed in accordance with the principles of the present invention.

FIG. 14 illustrates components used in association with a vehicle, such as a heavy-duty truck and the like (not shown). The vehicle includes two opposing longitudinally extending frame rails 400 positioned on opposite sides of the vehicle and having a preferred C-shaped configuration. The illustrated vehicle further includes tandem drive axles with a conventional housing (not shown). Those skilled in the art will appreciate that each drive axle extends laterally across the vehicle and is used to mount brakes, wheels and tires (not shown) driven by a vehicle engine (not shown).

In addition to the foregoing, the vehicle further includes a suspension generally designated by reference numeral 402, which connects the drive axle housings to frame rails 400 positioned on opposite sides of the vehicle.

As will be appreciated, with respect to suspension 402, the majority of the components positioned on one side of the vehicle will have correspondingly similar components positioned on the other side. Accordingly, in this description, when reference is made to a particular suspension component, it will be understood that a similar component is present on the opposite side of the vehicle, unless otherwise apparent.

Suspension 402 includes a plurality of components including frame hangers 404 mounted on opposite sides of the vehicle to frame rails 400. Suspension 402 further includes longitudinally extending main beams 406 connected at one end to a frame hanger 404. At the other end, beams 406 are connected to a laterally extending crossbrace 408 by way of a beam-to-brace connection assembly 410. As shown, a single crossbrace 408 is utilized for each axle using the suspension 402 illustrated in FIG. 14. As such, crossbrace 408 extends laterally across the vehicle to connect with the rearward ends of beams 406 positioned on opposite sides of the vehicle. Those skilled in the art will appreciate that, alternatively, crossbrace 408 could connect between oppositely positioned beams 406 intermediate their ends.

Crossbrace 408 forms a semi-torsion bar which lifts and rotates while resisting moments about all three axes of a Cartesian coordinate system. Crossbrace 408 is the primary component contributing to roll stability for suspension 402.

A secondary component for the roll stability of suspension 402 is the bushing (not shown) that is used to connect each when beam 406 with a frame hanger 404. This bushing is preferably a sleeveless bushing and has an outer rim surface on each end thereof trapped and compressed between the beam and the inner walls of the depending panels of the frame hanger when the bushing is installed within the bore positioned at the forward end of beam 406 and when beam 406 is connected to frame hanger 404. As such, this outer surface of the bushing reacts against vehicle roll as the vehicle negotiates sharp turns and the trapped conical rate of the bushing provides additional roll stability.

Between their ends, beams 406 include an axle pivot bore (not shown), which permits an axle clamp assembly generally designated by reference numeral 412 to connect the drive axle housing to each beam 406 for pivotal movement. The axis of the axle pivot bore is parallel to the centerline of the drive axle. The combination of beam and control rod linkages to the axle react brake and drive torques, which characterizes the suspension as non-reactive. Details of the axle clamp assembly 412 are set forth in further detail in the description regarding other figures of the drawing.

Further shown in FIG. 14 is a longitudinally extending control or torque rod 414 that is connected between frame hanger 404 and a component part of axle clamp assembly 412. Together, torque rods 414 and beams 406 form a parallelogram geometry that contributes to one of the desired characteristics exhibited by suspension 402. The optimized geometry distributes loads between the torque rods 414 and beams 406 so that they are shared. The load distribution, handling characteristics and roll stability of suspension 402 can be tuned by varying the geometry thereof.

Similarly, laterally extending control or torque rods 416 are included within suspension 402 and are connected between the drive axle housings and frame rails 400. Laterally extending torque rods 416 extend in a direction generally transverse to the direction in which longitudinally extending torque rods 414 extend. Accordingly, laterally extending torque rods 416 can also be referred to as a transverse torque rods.

An axle housing control rod mounting bracket (not shown) is mounted to the drive axle housing in order to permit a laterally extending torque rod 416 to connect to the drive axle housing. Similarly, a frame rail control rod mounting bracket 418 is mounted to frame rail 400 on one side of the vehicle to permit a laterally extending torque rod 416 to connect to the frame rail on which it mounts.

Suspension 402 further includes a shock damper 420 connected at its upper end to an upper shock bracket 422 mounted to frame rail 400 and at its lower end to the axle clamp assembly 412. Suspension 402 further includes air springs 424 connected at their respective top ends to an air spring mounting bracket 426 that is mounted to frame rail 400. Air-springs 424 are mounted on crossbrace 408 by way of an air spring mounting assembly 428, which is described with reference to FIG. 18.

FIG. 14 also illustrates outboard axle stops 430 mounted on frame rails 400. As will be understood by those skilled in the art, in certain applications, air will be exhausted from the suspension to ride on the axle stops. For instance, this is done to increase vehicle stability during events such as tipping a dump body to unload. The top pad component of the axle clamp assembly 412 can strike bump stop 430 during jounce and the vertical load will pass through the top pad directly into the clamped drive axle.

FIG. 15 illustrates another tandem drive axle suspension generally designated 500. Suspension 500 is used in those situations where it is desired to have a vehicle construction wherein the distance between the drive axles and vehicle frame is relatively large. These are typically vehicles that require additional ground clearance or packaging for drivelines. Applications include but are not limited to front discharge mixers, mobile cranes, forestry vehicles, and fire/rescue vehicles.

Suspension 500 is, in large part, similar to suspension 400 shown in FIG. 14. With respect to suspension 500, however, it includes different frame hangers 502 from those shown in FIG. 14. Besides hanging longer, as is the case with many of the components in suspension 500, frame hangers 502 includes a fore-and-aft extending slot that enables its associated longitudinal control rod to be connected at horizontally differing positions with respect to the frame hanger. As a result, the orientation of each longitudinal control rod can be adapted to suit the desired characteristics of the suspension, and the suspension can be tuned appropriately.

Each suspension 500 illustrated in FIG. 15 includes an axle stop 504a and an axle stop 504b that are different from the corresponding axle stops illustrated in FIG. 14. Each axle stop 504a includes a C-shaped portion having a base portion with bores that enable the axle stop to be mounted to its associated frame rail. Each axle stop 504a also includes a reinforcement gusset, as shown. Each axle stop 504a further includes a bottom plate that serves as an axle stopping surface, or top pad striking surface, to limit axle travel.

With respect to axle stops 504b, they are solid with a bottom plate that serves as an axle stopping surface, or top pad striking surface, to limit axle travel. Axle stops 504b also serve as mounting brackets for the laterally extending control rods in suspension 500. In that regard, the laterally extending control rods extend underneath the frame rails.

In addition to the foregoing, other components included within suspension 500 illustrated in FIG. 15 are different from their corresponding components included within the suspension illustrated in FIG. 14.

Figure 16:
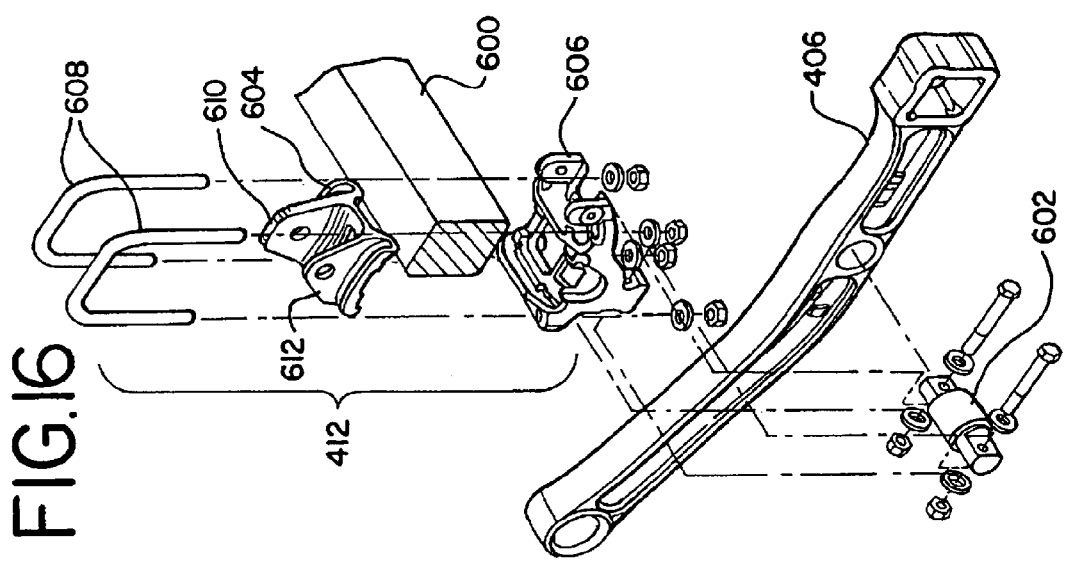
FIG. 16 is an exploded perspective view of an axle clamp assembly and certain other associated components that may be included within a suspension constructed in accordance with the principles of the present invention.

FIG. 16 illustrates a representative drive axle housing 600, axle clamp assembly 412, beam 406 and a D-shaped bar pin bushing 602. As shown, axle clamp assembly 412 includes a top pad component 604, a axle hanger 606, two laterally spaced, downwardly projecting U-bolts 608 and sets of washer and nut fasteners that are applied to the threaded ends of the U-bolts. Top pad component 604 includes an inboard ear 610 and an outboard ear 612. Inboard ear has a relatively thick construction and includes a flattened top surface. Outboard ear 612 tapers to a rounded peak and is relatively thin as compared to inboard ear 610. Both ears 610, 612 include bores that are aligned to permit mounting of a longitudinal control rod 414 (see FIG. 17). Top pad component 604 also includes two grooved portions that enable the longitudinally extending base portions of U-bolts 608 to sit therein.

The connection of axle hanger 606 with beam 406 through D-shaped bar pin bushing 602 is described elsewhere in this specification.

Figure 17:
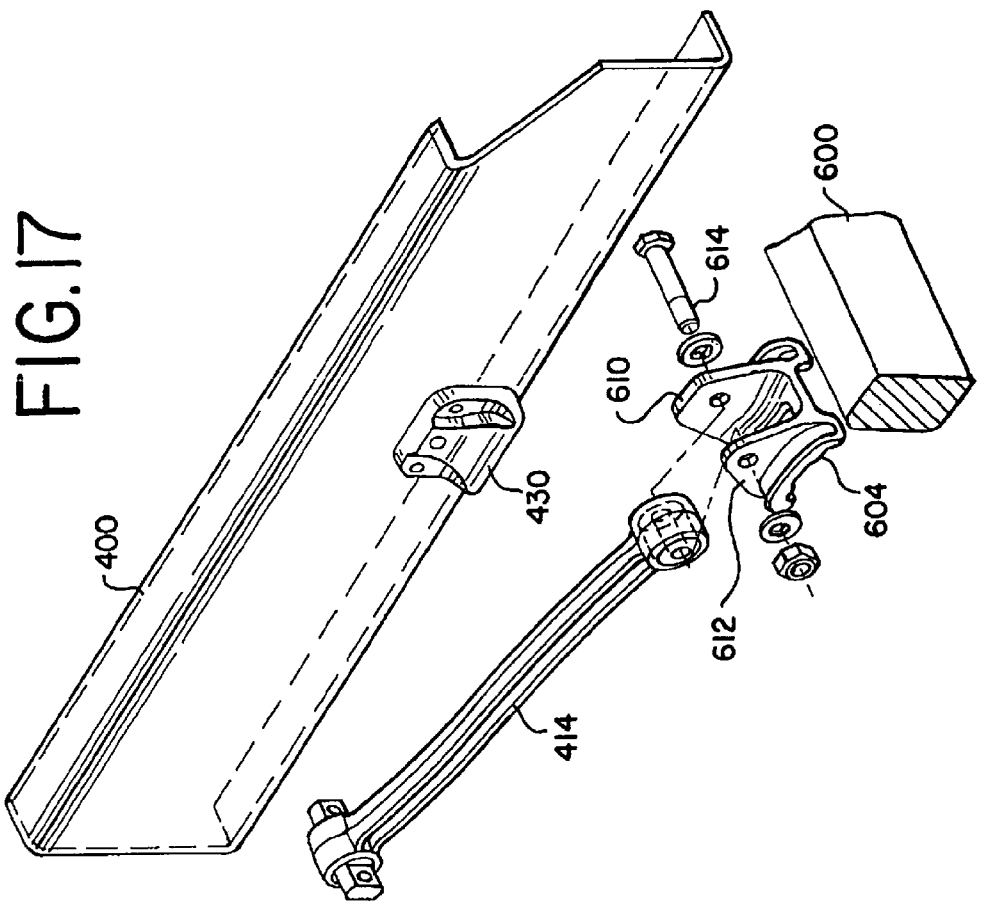
FIG. 17 is an exploded perspective view of an axle stop and top pad sub-system and other associated components that may be included within a suspension constructed in accordance with the principles of the present invention.

FIG. 17 illustrates one of the C-shaped vehicle frame rails 400, an axle stop 430, a longitudinally extending control rod 414, top pad component 604, control rod mounting fastener assembly 614, and a representative drive axle housing 600. The axle stop 430 is mounted to vehicle frame rail 402. The axle stop 430 illustrated in FIG. 17 is a casting. Axle stop 430 includes bores that enable it to be mounted to frame rail 400 and further includes a flattened bottom striking surface for contact with the inboard ear 610 of top pad component 604.

Longitudinal control rod 414 is mounted between inboard ear 610 and outboard ear 612 of top pad component 604 by way of the control rod mounting fastener assembly 614. Top pad component 604 is seated on drive axle housing 600 and secured thereto by U-bolts 608 (see FIG. 16).

When air is exhausted from the suspension in order to ride the axle stops, the relatively thick inboard ear 610 will strike the bottom surface of axle/bump stop 430 during jounce and the vertical load will pass through the top pad directly into the clamped drive axle 600. As a result, the axle jounce travel is limited. The amount of axle travel during jounce can be tuned by changing the vertical position of the frame mounted axle stop 430, or by changing the axle stop geometry. A recess (not shown) is preferably included on the inboard side of inboard ear 610. The bolt head and inboard washer preferably included within fastener assembly 614 is nested into this recess to increase clearance between the bolt head or fastener assembly 614 and the frame rail 400 in a jounce condition.

Figure 18:
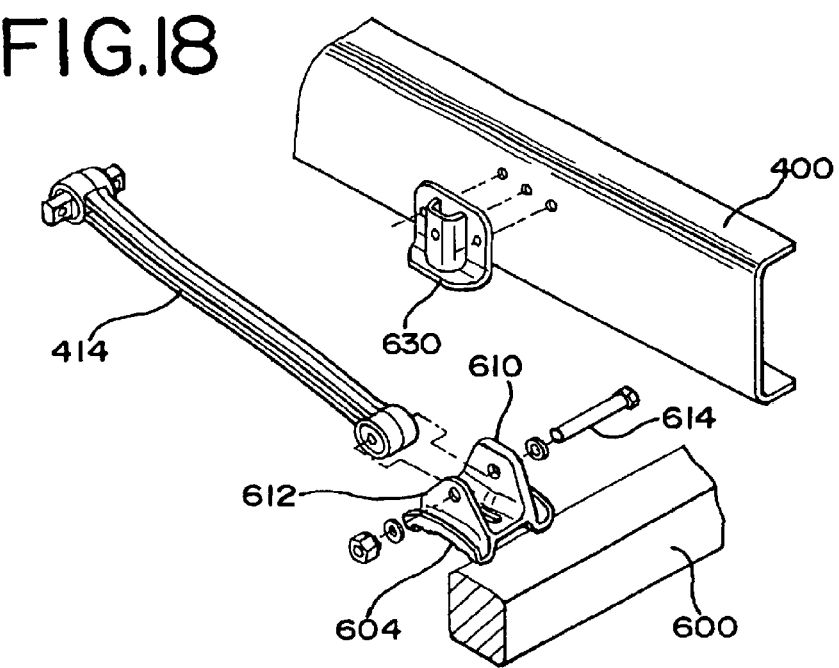
FIG. 18 is an exploded perspective view of another axle stop and top pad sub-system and other associated components that may be included within a suspension constructed in accordance with the principles of the present invention.

FIG. 18 illustrates these same components, but utilizes an axle stop 630 that is a fabrication in lieu of a casting. Other than the foregoing, the description in reference to FIG. 17 applies to the components illustrated in FIG. 18.

Figure 19:
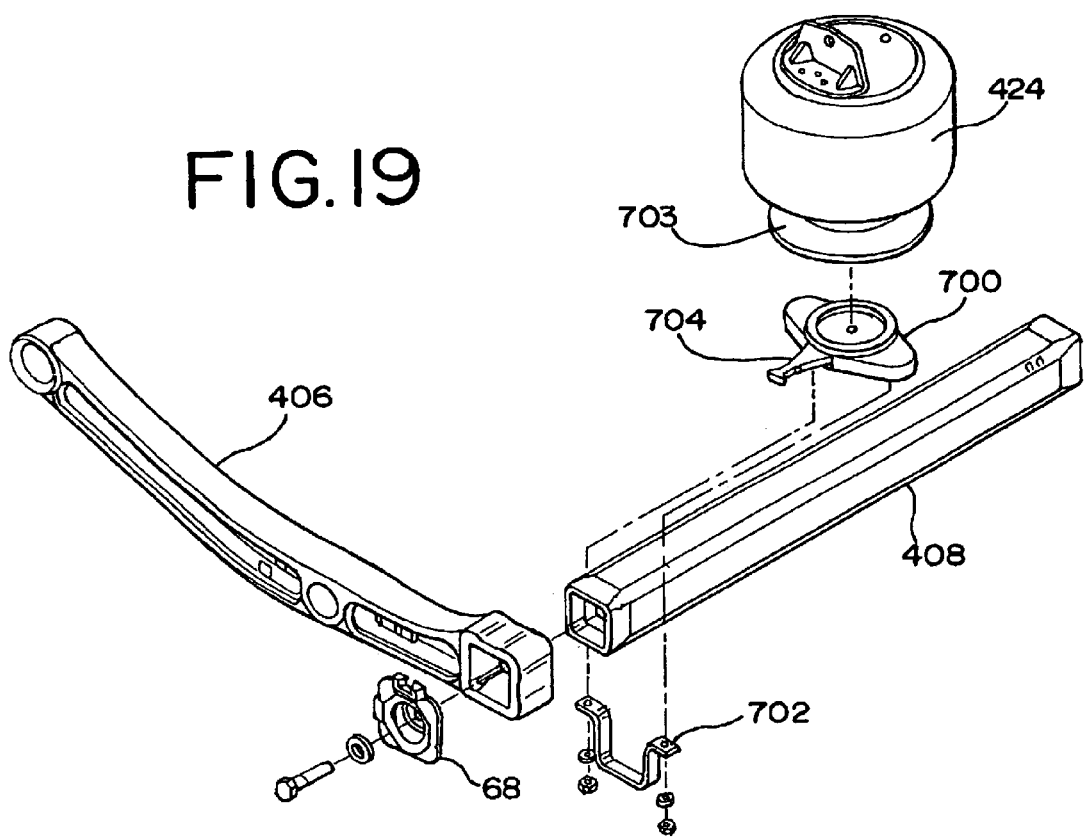
FIG. 19 is an air spring mounting assembly and beam-to-crossbrace joint assembly that may be included within a suspension constructed in accordance with the principles of the present invention.

FIG. 19 illustrates an air spring 424, a crossbrace 408 and an air spring mounting assembly. Air spring mounting assembly includes a spacer 700, a bracket 702 and fasteners. The spacer 700 is a component not included within conventional air spring assemblies. Spacer 700 elevates the air spring piston 703 (see also FIG. 20) and mounts it directly to crossbrace 408. Spacer 700 is preferably made from injection-molded glass reinforced plastic in accordance with conventional manufacturing techniques. Spacer 700 could also be made by other manufacturing techniques. Additionally, spacer 700 could be made from different materials, such as die cast aluminum or cast iron, for example. Spacer 700 is preferably fastened to the air spring piston base by a single center-mounted fastener (see FIG. 20). Alternatively, spacer 700 could be glued to the air spring piston 703. Still further, spacer 700 and the air spring piston 703 could be molded as a single component.

This air spring assembly, which includes spacer 700, and is illustrated in FIG. 20, is mounted to crossbrace 408 by lower air spring bracket 702 that is shaped as a hat section with a longitudinally extending base, vertically upwardly extending legs that extend from the ends of the base, and longitudinally extending flanges that extend from the ends of the upward legs. The flanges have bores to enable the bracket 702 to be secured to spacer 700 by the studs molded into the air spring spacer (see also FIG. 21).

Spacer 700 includes a winged portion 704 that preferably uses a dovetail joint at its end to engage the end cap or retainer plate 68 of the beam-to-crossbrace joint assembly. Those skilled in the art will recognize that the dovetail joint could embody an alternative design. This feature simplifies air spring installation by providing a mechanism to permit the air spring to be located at its precise lateral position on the crossbrace. In addition, this feature provides lateral support for the air spring by prohibiting it from slipping laterally inboard.

In addition, spacer 700 has a stop 705 (see FIGS. 20 and 21) positioned on the underside of the spacer and forming the edge of the base portion of the spacer extending downward from the boundary between the spacer base portion and spacer winged portion 704. Stop 705 bears against the inboard edge of the beam to provide lateral support for the air spring by prohibiting it from slipping laterally outboard.

While this invention has been described with reference to certain illustrative embodiments, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

What is claimed is:

1. A spacer for connecting an air spring assembly to a suspension component, said spacer comprising:

a substantially planar base portion having a top surface adapted to allow an air spring assembly to be mounted thereon and a bottom surface adapted to allow said spacer to be mounted on said vehicle suspension component; and a wing portion projecting from said base portion in a first direction along a same plane as said base portion, said wing portion having an end adapted to engage said vehicle suspension component;

wherein said wing portion allows said spacer to be positioned at a precise position on said vehicle suspension component and provides support by preventing said spacer from slipping in a second direction opposite said first direction when said wing portion is engaged with a suspension component.

2. The air spring spacer of claim 1 constructed from injection-molded glass reinforced plastic.

3. The spacer of claim 1 further including a stop positioned at an intersection of said base portion and said wing portion and extending lower than the bottom surface of said base portion to selectively bear against another vehicle suspension component for providing additional support by preventing said spacer from slipping in said first direction when said wing portion is engaged with a suspension component.

4. The spacer of claim 1 wherein said base portion includes a centrally disposed bore positioned to permit an air spring assembly to be mounted on said base portion.

5. The spacer of claim 4 wherein said base portion further includes two spacer mounting bores positioned on opposed sides of said centrally disposed bore, each of said spacer mounting bores sized to receive a fastener and permit said spacer to be secured to a vehicle suspension component.

6. The spacer of claim 5 wherein said two spacer mounting bores are positioned to cooperate with a bracket shaped as a hat section, said bracket including a base with first and second ends, a first leg extending normally from said base first end, a second leg extending normally from said base second end, a first flange extending normally from said first leg, a second flange extending from said second leg, said first flange having a first bore extending through it and positioned to be aligned with a first of said two spacer mounting bores, and said second flange having a second bore extending through it and positioned to be aligned with a second of said two spacer mounting bores.

7. The spacer of claim 1 wherein said spacer is adapted to mount on a crossbrace.

8. The spacer of claim 1 wherein said wing portion end comprises a dovetail joint.

9. The air spring spacer of claim 1 constructed from die cast aluminum.

10. The air spring spacer of claim 1 constructed from cast iron.

11. An air spring assembly comprising:

an air spring having a piston;

an air spring spacer;

said air spring spacer including a substantially planar base portion having a centrally located bore and first and second air spring spacer mounting bores positioned on opposite sides of said centrally located bore;

an air spring mounting fastener mounting said air spring piston on said air spring spacer;

said air spring spacer further including a wing portion projecting from said base portion in a first direction along a same plane as said base portion, said wing portion having an end adapted to engage said vehicle suspension component;

wherein said wing portion allows said spacer to be positioned at a precise position on said vehicle suspension component and provides support by preventing said spacer from slipping in a second direction opposite said first direction when said wing portion is engaged with said vehicle suspension component;

a bracket shaped as a hat section and adapted to receive said vehicle suspension component, said bracket including a base with first and second ends, a first leg extending normally from said base first end, a second leg extending normally from said base second end, a first flange extending normally from said first leg, a second flange extending from said second leg, said first flange having a first bore extending through it and positioned to be aligned with a first of said two spacer mounting bores, and said second flange having a second bore extending through it and positioned to be aligned with a second of said two spacer mounting bores;

a first air spacer mounting fastener inserted into said bracket first bore and said first air spring spacer mounting bore; and a second air spacer mounting fastener inserted into said bracket second bore and said second air spring spacer mounting bore.

12. The air spring assembly of claim 11 wherein said air spring spacer further includes a stop positioned at an intersection of said base portion and said wing portion to selectively bear against another vehicle suspension component for providing additional support by preventing said spacer from slipping in said first direction when said wing portion is engaged with a suspension component.

13. The air spring assembly of claim 11 wherein said air spring spacer is adapted to mount on a crossbrace.

14. The air spring assembly of claim 11 wherein said air spring spacer wing portion end comprises a dovetail joint.

15. The air spring assembly of claim 11 wherein said air spring spacer is bonded to said piston.

16. The air spring assembly of claim 11 wherein said piston further includes a centrally located axial bore, said piston bore and said air spring spacer centrally located bore being aligned to receive said air spring mounting fastener.

17. The air spring assembly of claim 11 wherein said air spring spacer is constructed from injection-molded glass reinforced plastic.

18. The air spring assembly of claim 11 wherein said air spring spacer is constructed from die cast aluminum.

19. The air spring assembly of claim 11 wherein said air spring spacer is constructed from cast iron.

20. The air spring assembly of claim 11 wherein said air spring spacer and said piston are molded as a single component.

* * * * *